(12) United States Patent
Hladik, Jr.

(10) Patent No.: US 9,473,347 B2
(45) Date of Patent: Oct. 18, 2016

(54) OPTIMIZING APPLICATION AVAILABILITY

(71) Applicant: INTERNATIONAL BUSINESS MACHINES CORPORATION, Armonk, NY (US)

(72) Inventor: William J. Hladik, Jr., Harrisburg, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 266 days.

(21) Appl. No.: 14/147,656

(22) Filed: Jan. 6, 2014

(65) Prior Publication Data
US 2015/0193294 A1    Jul. 9, 2015

(51) Int. Cl.
*G06F 11/07* (2006.01)
*H04L 12/24* (2006.01)
*G06F 11/00* (2006.01)

(52) U.S. Cl.
CPC .............. *H04L 41/00* (2013.01); *G06F 11/008* (2013.01)

(58) Field of Classification Search
USPC ....................................................... 714/47.3
See application file for complete search history.

(56) References Cited

U.S. PATENT DOCUMENTS

| | | | |
|---|---|---|---|
| 6,754,843 B1 * | 6/2004 | Lu ........................ | H04L 41/069 370/238 |
| 8,738,972 B1 * | 5/2014 | Bakman .................. | G06F 11/00 714/47.1 |
| 2003/0046615 A1 * | 3/2003 | Stone ..................... | G06F 9/5027 714/47.3 |
| 2004/0049372 A1 * | 3/2004 | Keller ..................... | H04L 41/06 703/22 |
| 2004/0167731 A1 * | 8/2004 | Wang ...................... | H02J 3/00 702/60 |
| 2004/0260967 A1 * | 12/2004 | Guha ..................... | G06F 11/008 714/3 |
| 2008/0295063 A1 * | 11/2008 | Svidenko ............ | G06F 17/5081 716/55 |

(Continued)

OTHER PUBLICATIONS

DiMarzio et al., "Scaling for High Availability: WebSphere XD and WebSphere Application Server for z/Os," ip.com, 2005, 38 pages.

(Continued)

*Primary Examiner* — Kamini Patel
(74) *Attorney, Agent, or Firm* — Matthew Chung; Andrew M. Calderon; Roberts, Mlotkowski, Safran, Cole & Calderon, P.C.

(57) ABSTRACT

An approach to an optimal application configuration. The approach includes a method that includes computing, by at least one computing device, an actual application impact based on an "N" number of failing information technology (IT) infrastructure components within an application architecture. The method includes determining, by the at least one computing device, a factor in likelihood of failure of the "N" number of IT infrastructure components. The method includes determining, by the at least one computing device, a failure profile for the application architecture based on the actual application impact and the factor in likelihood of failure.

18 Claims, 10 Drawing Sheets

(56) References Cited

U.S. PATENT DOCUMENTS

| | | | |
|---|---|---|---|
| 2009/0019258 A1 | 1/2009 | Shi | |
| 2009/0178046 A1* | 7/2009 | Jain | G06F 9/5005 718/104 |
| 2009/0254894 A1 | 10/2009 | Chen et al. | |
| 2009/0307166 A1* | 12/2009 | Routray | G06N 5/04 706/46 |
| 2010/0274596 A1* | 10/2010 | Grace | G06Q 10/0631 705/7.15 |
| 2011/0239048 A1* | 9/2011 | Andrade | G06F 11/3616 714/35 |
| 2012/0059680 A1* | 3/2012 | Guthrie | G06Q 10/063 705/7.11 |
| 2013/0111427 A1* | 5/2013 | Brunswig | G06F 8/71 717/100 |
| 2014/0089029 A1* | 3/2014 | Belur | G06Q 10/1097 705/7.21 |
| 2014/0129876 A1* | 5/2014 | Addepalli | H04L 41/064 714/37 |
| 2014/0372802 A1* | 12/2014 | Rao | G06F 11/079 714/37 |
| 2015/0142942 A1* | 5/2015 | Voruganti | H04L 63/00 709/223 |
| 2015/0309918 A1* | 10/2015 | Raghavan | G06F 11/3684 714/38.1 |

OTHER PUBLICATIONS

Roehm et al., "WebSphere Application Server Network Deployment V6: High Availability Solutions," ip.com, Oct. 2005, 654 pages.

* cited by examiner

|  | SITE 204 | BUILDING 206 | FLOOR 208 | SYSTEM 210 | LPAR 212 | OS INSTANCE 214 |
|---|---|---|---|---|---|---|
| CHANCE OF FAILURE 402 | 0.50% | 1% | 1.40% | 3% | 5% | 10% |
| COST RATIO 404 | 75% | 20% | 10% | 7% | 4% | 2% |

FIG. 4

| FEED SERVERS 502 | WEB LOAD BALANCER SERVERS 504 | PROXY SERVERS 506 | APP LOAD BALANCE SERVERS 508 | WEB SERVERS 510 | APP SERVERS 512 | DB SERVERS 514 | MQ SERVERS 516 |
|---|---|---|---|---|---|---|---|
| METHOD 1 | METHOD 1 | METHOD 1 | METHOD 1 | METHOD 1 | METHOD 1 | METHOD 1 | METHOD 1 |
| 5.0% | 50% | 33.3% | 50% | | 20% | 12.5% | 50% |
| | 50% | 33.3% | 50% | | 20% | 12.5% | 50% |
| | | 33.3% | | | 20% | 12.5% | |
| | | | | | 20% | 12.5% | |
| | | | | | | 12.5% | |
| | | | | | | 12.5% | |

FIG. 8

| FEED SERVERS 502 | WEB LOAD BALANCER SERVERS 504 | PROXY SERVERS 506 | APP LOAD BALANCE SERVERS 508 | WEB SERVERS 510 | APP SERVERS 512 | DB SERVERS 512 | MQ SERVERS 514 |
|---|---|---|---|---|---|---|---|
| METHOD 2 | METHOD 2 | METHOD 2 | METHOD 2 | METHOD 2 | METHOD 2 | METHOD 2 | METHOD 2 |
|  |  |  |  |  | 100% | 5% |  |
|  |  |  |  |  | 100% | 5% |  |
|  |  |  |  |  | 6% | 5% |  |
|  |  |  |  |  | 1% | 5% |  |
|  |  |  |  |  | 1% | 5% |  |
|  |  |  |  |  | 1% | 5% |  |

FIG. 9

OPTIMIZING APPLICATION AVAILABILITY

FIELD OF THE INVENTION

The present invention generally relates to failure analysis, and more particularly, to a method and system for determining an optimum application configuration that achieves maximum protection with minimum costs.

BACKGROUND

Modern day distributed applications (e.g., applications for accounting systems, order fulfillment systems, shipping and logistics systems, etc.) can have many components such as aggregators, load balancers, proxies, reverse proxies, web front ends, application servers, database servers, message brokers, etc. In some applications, to facilitate the maximum throughput and availability, application components may be "clustered" or set up with some form of redundancy. As such, successful application transaction flows have a path that can traverse many layers of application components. Furthermore, within a distributed computing environment, one or more of the application components can be a logical server operating system instance running on a virtual or a physical information technology (IT) infrastructure. Thus, application components can be IT infrastructure appliances and/or associated with an IT infrastructure component. Also, IT infrastructure components can work within a containerized IT component hierarchy, such as, for example, a component nested within a logical partition (LPAR) which is nested within a system which is nested within a building which is nested within a site.

However, IT infrastructure components can fail from time to time, with the mean time between failures or relative degree of failure varying based on characteristics of different IT infrastructure components. When an IT infrastructure component fails, the entire distributed application may be impacted. Depending on the application's architecture, the failure can be classified as a catastrophic failure, a major failure, a minor failure, or may result in no failure from the application's perspective.

SUMMARY

In a first aspect of the invention, a method includes computing, by at least one computing device, an actual application impact based on an "N" number of failing information technology (IT) infrastructure components within an application architecture. The method further includes determining, by the at least one computing device, a factor in likelihood of failure of the "N" number of IT infrastructure components. The method further includes determining, by the at least one computing device, a failure profile for the application architecture based on the actual application impact and the factor in likelihood of failure.

In another aspect of the invention, there is a computer program product for analyzing an application architecture. The computer program product includes a computer usable storage medium having program code embodied in the storage medium. The program code is readable/executable by a computing device to compute an actual application impact based on an "N" number of failing IT infrastructure components within an application architecture. The computer program product includes determining a factor in likelihood of failure of the "N" number of IT infrastructure components failing. The computer program product includes determining a failure profile based on the actual application impact and the factor in likelihood of failure. The failure profile includes computing an average of product failure values for the "N" number of IT infrastructure components. The product failure value is determined by taking the product of the computed actual application impact and a chance of failure of value for one or more of the "N" number of IT infrastructure components.

In a further aspect of the invention, a system includes a CPU, a computer readable memory and a computer readable storage medium. Additionally, the system includes one or more program instructions. Program instructions are operable to determine a cost profile for an application architecture based on "N" number of IT infrastructure component information, cost ratio information, and cost influence information. Program instructions are operable to determine a protection profile for the application architecture based on the "N" number of IT infrastructure component information and maximum protection information. Program instructions are operable to determine a failure profile for the application architecture based on the "N" number of IT infrastructure component information, application component information, and chance of failure information. The failure profile indicates a level of resistance of the application architecture to failure of one or more of the "N" number of IT infrastructure components. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 4-10 show example data structures in accordance with aspects of the invention.

DETAILED DESCRIPTION

Figure 1:
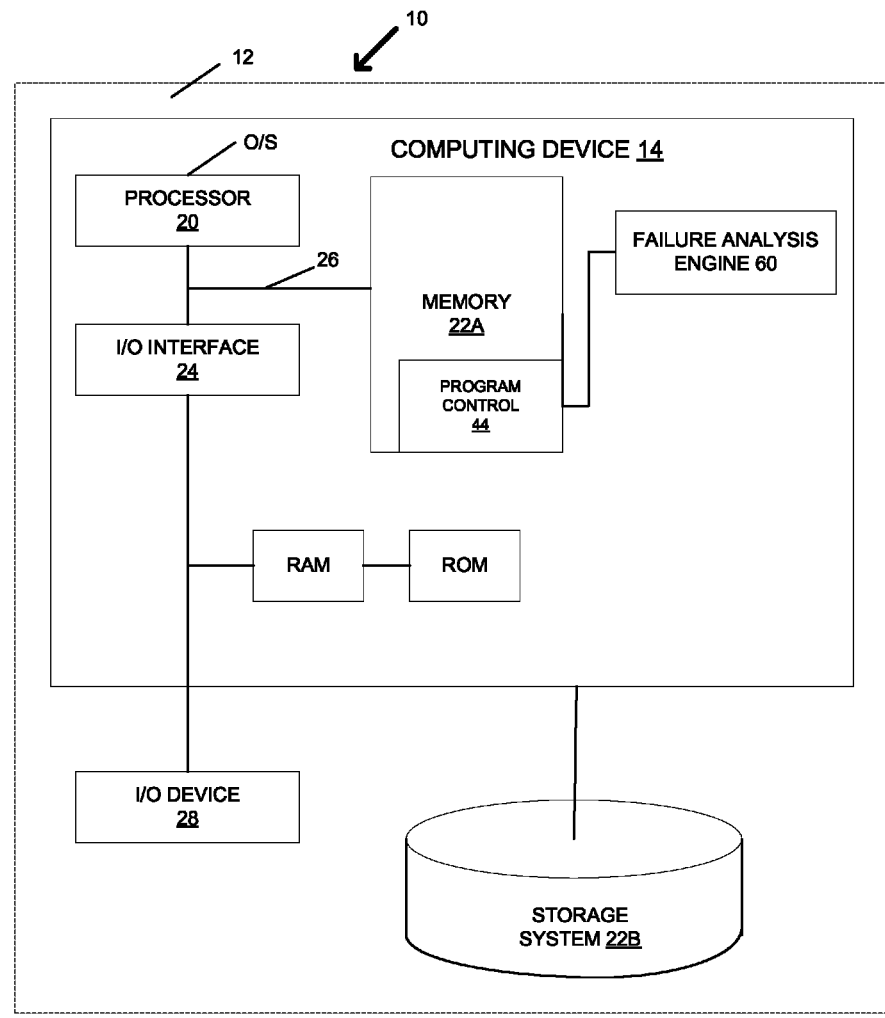
FIG. 1 an illustrative environment for implementing the steps in accordance with aspects of the invention.

The present invention generally relates to failure analysis, and more particularly, to a method and system for determining an optimum application configuration that achieves maximum protection with minimum costs. In embodiments, the present invention analyzes multiple simulations/scenarios of how different IT infrastructure components fail and how the failures cause failure of different application components of a distributed application (e.g., distributed in one or more geographic locations and/or one or more devices) and ultimately the affect on the overall performance of the distributed application. In embodiments, the analysis includes assessing the impact of the failures to the application by taking into consideration different factors. In embodiments, the different factors can include: (i) determining a failure profile; (ii) determining a cost profile; (iii) determining a protection profile; and (iv) analyzing different scenarios (e.g., increasing the number of non-redundant application components, adding fully redundant clustered servers, using smaller servers that run in workload pairs, etc.). These factors can be used to modify the application architecture and/or change the IT infrastructure components to determine the effect on the failure profile, the cost profile, and/or the protection profile.

In assessing the impact of failures by modifying the IT infrastructure components and the application architecture, the present invention allows for the development of goals in designing an application architecture that creates a particular number of redundant application components that can survive an IT infrastructure outage/failure. By way of example, an application with one component will completely fail if the IT infrastructure component on which the application is running fails. Alternatively, a two layered application may include an application server and a database server which are both necessary for the application to function. If either the application server or the database server fails, then the application will completely fail. However, by way of another example, if the application has one application server and two database servers and one of the database servers fails, then there is still a risk of complete failure with the failure of the application server but a 0% risk if one of the database servers fails. Adding another application server to the example results in a system that can handle 100% of the application's throughput load since there is redundancy for both the application server and the database server. However, adding additional components results in additional costs.

Thus, the present invention determines an optimal configuration which results in costs that are minimized while providing the greatest amount of functionality with an acceptable level of application impact. As such, the present invention balances the need for usability of an application in the event of a failure and how much should be invested to ensure that the minimum level of usability of the application is available during any level of failure. Accordingly, based on the location of the application components, the application architecture allows for an application that can function with a reduced throughput state and achieve an optimal high availability of the application at an optimal cost.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium and/or device (hereinafter referred to as computer readable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a failure analysis engine 60, e.g., the processes described herein. Failure analysis engine 60 can be implemented as one or more program code in program control 44 stored in memory 22A as separate or combined modules. Additionally, failure analysis engine 60 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in computing device 14.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Failure analysis engine 60 may receive information regarding distributed applications with their associated components and determine an application architecture that will result in the minimum amount of failure for a minimum cost. In embodiments, failure analysis engine 60 may have a user interface, e.g., I/O interface 24, that allows a user to input and define profile information for a particular application. In embodiments, the user interface can request: (i) an IT infrastructure component on which the application component will be operating on; (ii) an identifier for each application component (e.g., DB Server 3); (iii) an application impact percentage if the application component fails (e.g., 10% means that the application is affected by 10% if that particular application component fails); and/or (iv) the type of method to be used in calculating failure impacts. In embodiments, an implementation of the present invention can analyze a particular application layer with the impact percentage being a portion of the overall function/throughput of all application components in that particular application layer (referred to as "method 1"). Additionally, or alternatively, an implementation of the present invention analyzes components in an overall application across all layers/categories (referred to as "method 2"). Thus, the impact percentage is a portion of the overall function/throughput of the entire application. While the noted implementations can be used to identify two types of methods for determining failure impact, these implementations can be given different identifiers and, furthermore, other types of methods can also be used to determine the failure impact.

In embodiments, the user interface can also request information to allow failure analysis engine 60 to generate and store database structures that will relate to how application components will be located on different IT infrastructure components. For example, the database structure can include a row (or a column) to store information for each operating system (OS) instance and each column (or row) can be associated with a particular IT infrastructure component. Although this is a preferred format of the implementation, the present invention contemplates other formats.

In further embodiments, failure analysis engine 60 can allow a user, via the user interface, to enter different assumptions into the analysis that is to be performed by failure analysis engine 60. For example, the different assumptions can be different types of IT infrastructure element levels (e.g., site, building, system, LPAR, OS instance, etc.) and how each element level is nested or incorporated into other element levels (e.g., building can contain floors, floors can contain systems, etc.). Further, in embodiments, a cost ratio can be provided via the user interface to failure analysis engine 60. The cost ratio can be how much or less expensive it is to choose a particular IT infrastructure element, e.g., how much more does it cost to use a different floor or different site, etc. Also, in embodiments, a chance of failure can be provided via the user interface to failure analysis engine 60. The chance of failure can be the likelihood that each IT infrastructure component can fail. The chance of failure values can be determined by calculated values or use database availability percentages for the values.

As such, by using the profile information, database structure, and different assumptions, failure analysis engine 60 can determine different scenarios for computing the overall application impact if different IT infrastructure components fail. In embodiments, failure analysis engine 60 can generate the overall application impact which includes: a cost profile, a protection profile, and a failure profile.

In embodiments, the cost profile determines how much does the application architecture cost. As the percent value for the cost profile increases, the greater the cost associated with selecting a greater number of systems, devices, and/or buildings. For example, an application architecture with one building may cost less than an application architecture with five buildings; or an application architecture with 5 LPARs may cost less than an application architecture with 10 LPARs. In embodiments, the protection profile is associated with diversification of the application components. For example, a high percentage number for the protection profile can indicate that the application components are distributed amongst different sites, buildings, floors, systems, LPARs, etc. In embodiments, the failure profile is how resistant the application architecture is to failure. A high percentage value can indicate a greater level of resistance than a level of resistance associated with a lower percentage value. In embodiments, the failure profile can use an iterative process that calculates failure for one or more components by computing an actual application impact and associating the actual application impact to a factor in likelihood of failure (also referred to as the chance of failure) to determine an impact on that particular iteration. Accordingly, a failure profile is computed for the total number of iterations.

With the cost profile, the protection profile, and the failure profile values provided to a user of failure analysis engine 60, the user can make additional changes to the profile information, the database information, and the assumptions to achieve different cost profile values, different protection profile values, and different failure profile values. As such, failure analysis engine 60 allows for multiple scenarios to be analyzed and compared to each other such that different scenarios, which provide the outcome desired by the user, can be determined in accordance with aspects of the present invention. In embodiments, failure analysis engine 60 can generate one or more diagrams, charts, or other descriptive figures that define the application architecture based on the inputs into failure analysis engine 60. Thus, a user of failure analysis engine 60 can determine how different application components are placed in different sites, buildings, floors, systems, LPARs, etc., so as to achieve the optimum high availability of the application at an optimum cost.

Figure 2:
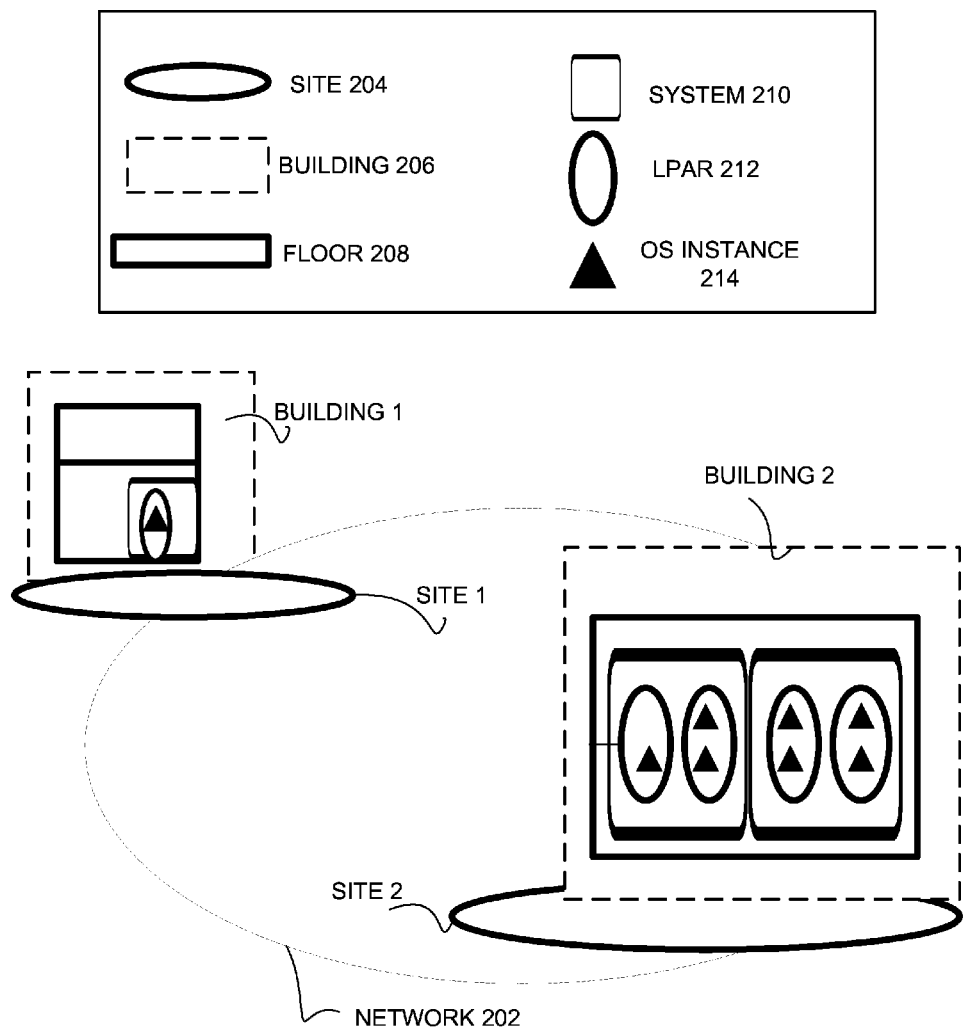
FIG. 2 is an example network diagram in accordance with aspects of the invention.

FIG. 2 shows an example network diagram in accordance with aspects of the invention. FIG. 2 shows a network 202 that includes one or more of the following: site 204, building 206, floor 208, system 210, LPAR 212, and OS instance 214. In embodiments, FIG. 2 can be a description of an application architecture that is generated by a failure analysis engine. And, while FIG. 2 indicates a particular number of different types of IT infrastructure components, network 202 can include greater or fewer quantities of each type of IT infrastructure component as should be understood by one of skill in the art.

Network 202 can include one or more different sites 214 that are interconnected with each other. In embodiment, each different site 214 can be located in a different geographic location. For example, as shown in FIG. 2, site 1 and site 2 could be two sites on an industrial site. Alternatively, site 1 could be in a different city, state, or country than site 2. Within network 202, different sites 214 can send/receive information via wireless, wired, and/or a combination of wireless and wired systems. Furthermore, within network 202, different sites 214 can use the Internet, Intranet, wide area networks (WANs), local area networks (LANs), fiber-optic cable, and/or other types of communication infrastructure to communicate with each other.

Site 204 can be a type of IT infrastructure component that has one or more other types of IT infrastructure components nested within site 204. For example, in embodiments, site 204 can be a hierarchical infrastructure that can hold other IT infrastructure components, such as buildings, floors, systems, LPARs, OS instances, and/or other types of IT infrastructure components as representative examples. By way of example, site 204 can be a datacenter that has multiple buildings that stores multiple components of an application.

Building 206 can be a type of IT infrastructure component that has one or more other types of IT infrastructure components nested within building 206. For example, building 206 can be a hierarchical infrastructure that can hold other IT infrastructure components, such as floors, systems, LPARs, OS instances, and/or other types of IT infrastructure components. As shown in FIG. 2, there are two buildings (building 1 and building 2) that are located at separate sites, site 1 and site 2, respectively. By way of example, buildings 1 and 2 can be office buildings that store multiple components of an application.

Floor 208 can be a type of IT infrastructure component that has one or more other types of IT infrastructure components nested within floor 208. For example, floor 208 can be a hierarchical infrastructure that can hold other IT infrastructure components, such as systems, LPARs, OS instances, and/or other types of IT infrastructure components. By way of example, floor 208 can be a partition in a building that is situated at a different height, width, or length than other partitions and is used to create a defined area of space within building 206. For example, in FIG. 2, for example, building 1 may have two floors and building 2 may have one floor.

System 210 can be a type of IT infrastructure component that has one or more other types of IT infrastructure components nested within system 210. In embodiments, system 210 can be a hierarchical infrastructure that can hold other IT infrastructure components, such as LPARs, OS instances, and/or other types of IT infrastructure components. By way of example, system 210 can be a physical server or appliance hardware located within a particular partition of a building. As shown in FIG. 2, for example, building 1 has one system and building 2 has two systems.

LPAR 212 can be a type of IT infrastructure component that has one or more other types of IT infrastructure components nested within LPAR 212. In embodiments, LPAR 212 can be a hierarchical infrastructure that can hold other IT infrastructure components, such as OS instances, and/or other types of IT infrastructure components. By way of example, LPAR 212 can be a logical partitioning of computing resources within a system. The logical partitioning can be a physical partition, such as different memory cards or other devices, or the partition can be a virtual partition that partitions information into different locations within a device, such as a memory card. As shown in FIG. 2, for example, there are four LPARs 212 located within building 2 and one LPAR located in building 1.

OS instance 214 can be a type of IT infrastructure component that is nested in other types of IT infrastructure components, such as LPAR 212, system 210, etc. By way of example, OS instance 214 can be a logical partitioning of computing resources within a LPAR. As shown in FIG. 2, for example, there is one OS instance 214 in building 1 and seven OS instances 214 located within building 2.

While FIG. 2 shows a particular architecture/design with a particular failure profile, a failure analysis engine can change the placement of application components and also change the location and/or number of IT infrastructure components to achieve a different failure profile by using an iterative process as described herein.

Flow Diagram

Figure 3:
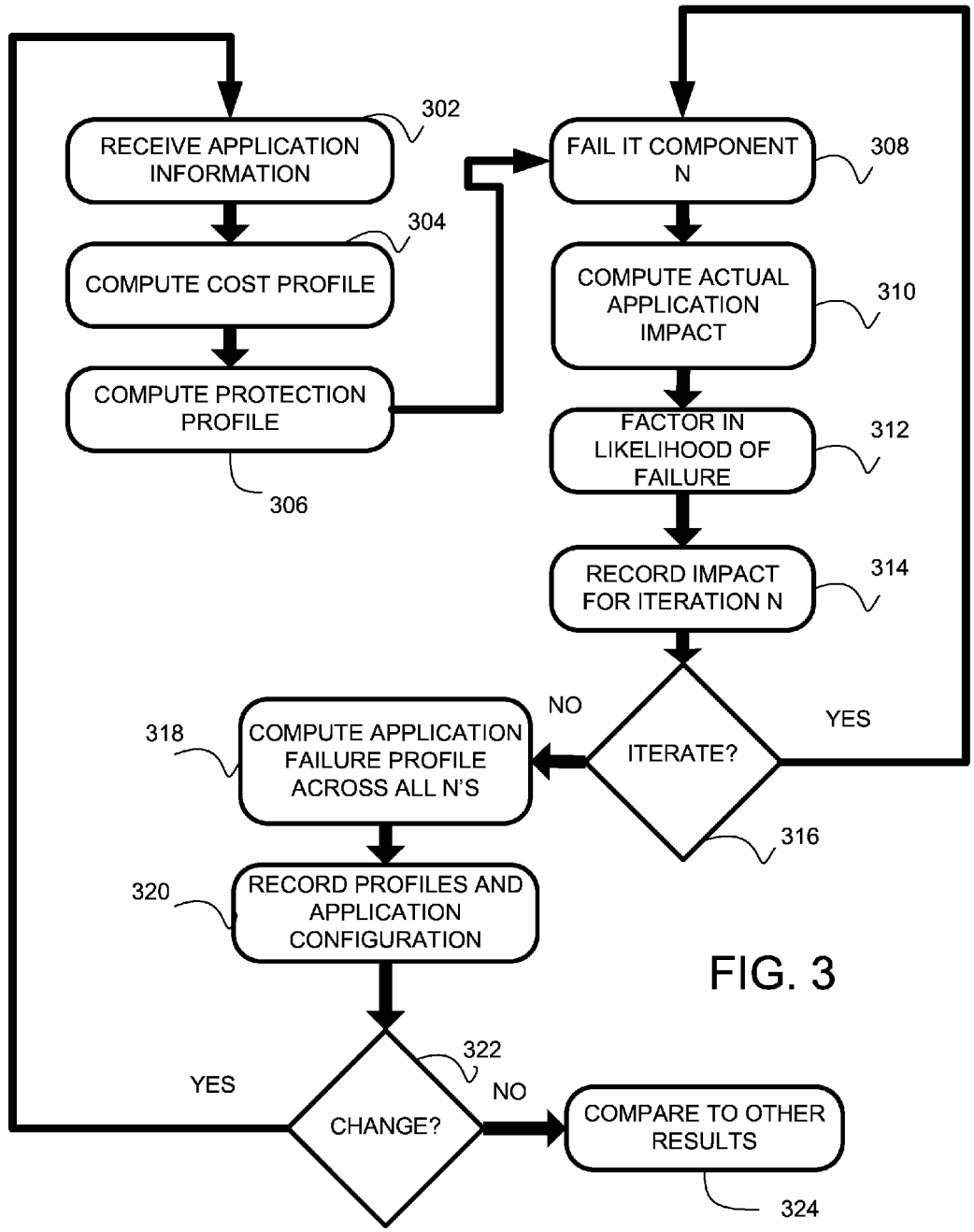
FIG. 3 shows an exemplary flow in accordance with aspects of the invention.

FIG. 3 shows an exemplary flow for performing aspects of the present invention. The steps of FIG. 3 may be implemented in the environment of FIG. 1 or FIG. 2, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
Figure 7:

FIG. 3 depicts an example flow for a process to determine an application architecture in accordance with aspects of the present invention. In embodiments, the example flow can be performed by a failure analysis engine. At step 302, a failure analysis engine can receive application information. In embodiments, the application information can include information regarding IT infrastructure components, identifiers for IT infrastructure components, method of determining failure impacts, a type of database structure, assumptions regarding different element levels (e.g., site, building, floor, system, LPAR, etc.), cost ratio, chance of failure, and/or other information. At step 304, the failure analysis engine determines a cost profile. In embodiments, the cost profile determines how much does the application architecture cost. As the percent value for the cost profile increases, the greater the cost associated with selecting a greater number of systems, devices, and/or buildings. (FIG. 6 provides further explanation of how the failure analysis engine determines the cost profile.) At step 306, the failure analysis engine determines a protection profile. In embodiments, the protection profile is associated with the diversification of the application components (e.g., the distribution of application components over a particular amount of IT infrastructure components). FIG. 7 provides further explanation of how the failure analysis engine determines the protection profile.

Figure 10:
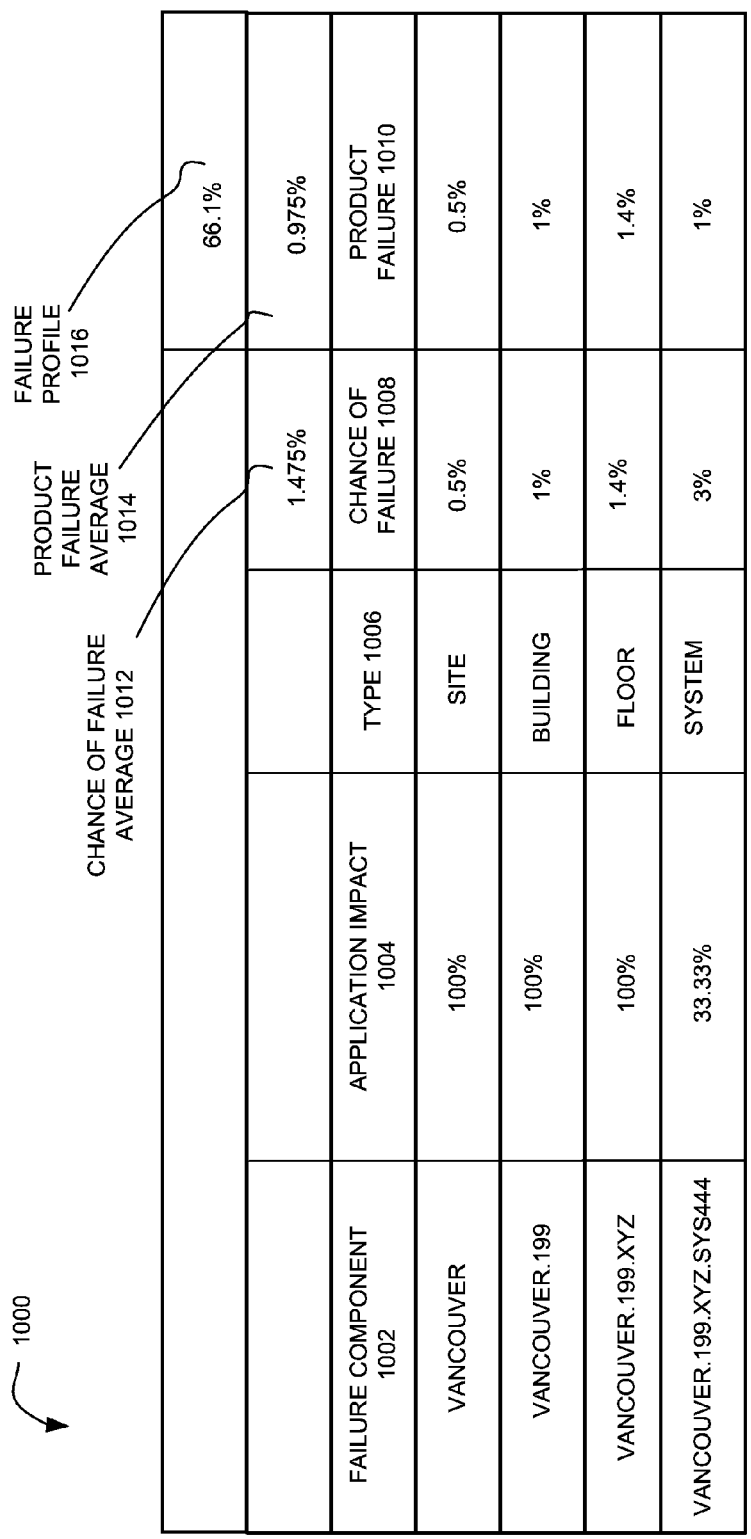

Steps 308-318 are used to determine a failure profile. FIGS. 8-10 provide further explanation of how the failure analysis determines the failure profile. For example, in embodiments, the failure profile is determined over all possible failures (N number computations) by computing the impact to the application for each failure. Additionally, a weighted average factoring can be used along with a likelihood of failure to determine a failure profile. More specifically, at step 308, the failure analysis engine begins the process of determining a failure profile by selecting or determining a particular IT infrastructure component that can fail within a hierarchy of IT infrastructure components. In embodiments, IT infrastructure component can indicate a single IT infrastructure component (e.g., a LPAR) being analyzed or any "N" number of IT infrastructure components (e.g., a system and a building) being analyzed. At step 310, the failure analysis engine determines the actual application impact of the selected IT infrastructure component. In embodiments, the application impact can be determined by using method 1, method 2, and/or any other type of method. For example, method 1 can analyze a particular application layer with the impact percentage being a portion of the overall function/throughput of all application components in that particular application layer. Method 2, on the other hand, can analyze components in an overall application across all layers/categories.

At step 312, the failure analysis engine uses a factor in likelihood of failure (also known as the chance of failure) to further determine the failure profile. In embodiments, the likelihood of failure is a value provided to the failure analysis engine or is a defined value that is stored by the failure analysis engine. At step 314, the failure analysis engine records (e.g., stores) the impact for iteration N.

At step 316, the failure analysis engine determines whether additional iterations are needed, e.g., whether additional components have been selected for failure analysis. For example, at step 316, a determination is made as to whether there are any IT infrastructure components that can be selected for failure analysis based on the number of components in the application architecture, any inputs into the failure analysis engine to perform a particular number of further iterations, and/or other additional factors. If additional iterations are needed (step 316—YES), then the failure analysis engine determines additional failure information by repeating steps 308-314. Thus, the failure analysis engine simulates additional failures for other IT infrastructure components using method 1, method 2, and/or any other type of method.

If additional iterations are not needed (step 316—NO), then, at step 318, the failure analysis engine determines a failure profile based on the iterations performed in steps 308-314. In embodiments, the failure analysis engine uses the value(s) of the actual application impact determined in step 310 and the likelihood of failure determined in step 312 to determine the failure profile. As such, the failure profile indicates the application architecture's degree of functionality in the event of different IT infrastructure components failing. In further embodiments, the failure profile may be expressed on a percentage scale, e.g., 0-100% scale, that can be used to assess how well or how poorly the application architecture is compared to other application architectures.

At step 320, the failure analysis engine stores the profiles and the application configuration. In embodiments, the failure analysis engine can generate a graphical description of the application configuration similar to that described in FIG. 2.

At step 322, the failure analysis engine determines whether additional changes are required. If so, (step 322—YES), then the failure analysis engine reverts to step 302. As such, a user of the failure analysis engine may determine that changes are to be made to the application configuration and may begin the process of determining new cost, protection, and failure profiles. If the user does not want to change the application profiles (step 322—NO), then, at step 324, the failure analysis engine provides a comparison of the results to other cost profile, protection profile, and/or failure profile results obtained by performing steps 302-324. The results may include a graphical description of the network that is similar to FIG. 2.

Data Structures

FIG. 4 shows an example data structure 400 associated with IT infrastructure components in accordance with the aspects of the invention. Data structure 400 includes site 204, building 206, floor 208, system 210, LPAR 212, OS instance 214, chance of failure 402, cost ratio 404. While data structure 400 includes fields 204-214 and 402-404, data structure 400 can include greater or fewer fields. Further, the fields are named in terms of application functionality. As such, these are examples of different layers and can use different terminology, which may not be industry standard terminology, for different applications. In embodiments, data structure 400 can be used by a failure analysis engine to store information regarding the chance of failure and cost ratios for different types of IT infrastructure components, also referred to as containers, such as buildings, floors, systems, LPARs, OS instances, etc. In embodiments, each of the IT infrastructure components can be provided an identifier, such as "Site.Building.Floor.System.LPAR.OS instance," or any other type of identifier. The identifiers can also be used to inter-relate different IT infrastructure components to each other. For example, an identifier can be used to show whether a floor is within a particular building and/or whether an OS instance is within a particular LPAR or system.

Chance of failure 402 can be a numerical ranking of one container (e.g., a building or any combinations of components shown in FIG. 2) versus another container. Thus, chance of failure 402 is a determination of failure. In embodiments, the value of chance of failure 402 can be determined by a user of a failure analysis engine or can be determined by using a mean time to failure (MTTF) and a mean time to recovery (MTTR). For example, using MTTF and MTTR to determine a chance of failure can be presented by:

Chance of Failure=MTTF/(MTTF+MTTR).

Cost ratio 404 can be a numerical ranking of one container versus another container. Thus, cost ratio 404 is a determination regarding how costly it is for the container to be used. For example, as shown in data structure 400, a 75% value for a site indicates that there can be a 75% impact to place an application component on an IT infrastructure component at a different site. Accordingly, if all the IT infrastructure components are all at the same site then there would not be the cost ratio of 75% since less costs are associated with having a single site versus multiple sites. The value in cost ratio 404 can be determined by the failure analysis engine by taking into consideration operational costs (e.g., costs per hour of operating), equipment costs, human costs (e.g., employee costs), and/or other types of costs (e.g., statistical analysis, such as using weighted averages). Alternatively, cost ratio 404 can be provided as an input to the failure analysis engine from the user or another computing device.

Figure 5:

FIG. 5 shows an example data structure 500 associated with application components in accordance with aspects of the invention. Data structure 500 includes feed servers 502, web load balanced servers 504, proxy servers 506, application load balance servers 508, web servers 510, application servers 512, database servers 514, and MQ servers 516. While data structure 500 includes fields 502-520, data structure 500 can include greater or fewer fields, different types of application components, and/or different types of fields. Further, the fields are named in terms of application functionality. As such, these fields are examples of different layers and can use different terminology, which may not be industry standard terminology, for different applications. In embodiments, within a given application layer (e.g., application servers 512) there may be several clustered nodes any of which can handle the functional duties of that layer.

As shown in FIG. 5, for example, proxy servers 506 is an application layer that includes three proxy servers (UY45, UY56, and UY93) that perform the functional duties for proxy servers 506. In embodiments, the clustered nodes shown in FIG. 5 can handle the functional duties of that layer and can be configured as active/passive, active/active, or the clustered nodes can represent a portion of the application's overall function and operate independently from other nodes in that particular layer. In further embodiments, the distribution of information in data structure 500 also allows for different types of failure analysis. For example, one type of failure analysis determines a transition flow that is successful if a transition makes its way through all application layers, when moving in a horizontal direction (e.g., left to right in data structure 500). Further, for example, another type of failure analysis determines that each individual component contributes to a percentage of the success of the overall application. In using any type of failure analysis, one or more failed application components results in an overall application impact that can be expressed as a percentage.

Feed servers 502 can be one or more computing devices, such as servers, workstations, computers, etc., that provide information and/or communications to all other computing devices within a hierarchical computing architecture. Web load balanced servers 504 can be one or more computing devices, such as servers, workstations, computers, etc., which receive web based information and distribute the information load to other servers. Proxy servers 506 can be one or more computing devices, such as servers, workstations, computers, etc., which act as intermediaries between other devices. For example, a device may send information to proxy server 506 and instruct proxy server 506 to send the information to another device, which proxy server 506 may perform. Appliance load balance servers 508 can be one or more computing devices, such as servers, workstations, computers, etc., which distribute information associated with different devices to other devices. Web servers 510 can be one or more computing devices, such as servers, workstations, computers, etc., which are associated with web-based services.

Application servers 512 can be one or more computing device, such as servers, workstations, computers, etc., which store, distribute, and perform different functions relating to a particular application. For example, one application server 512 may be associated with security functions for an application and another application server 512 may be associated with graphical user interface functions for an application. Database servers 514 can be one or more computing devices, such as servers, workstations, computers, etc., which store information associated with an application. Different database servers 514 can store different information, such as identifier information, security information (e.g., passwords), and/or other information used by the application.

MQ servers 516 can be one or more computing devices, such as servers, workstations, computers, etc., which provide middleware functions for an application.

Cost Profile

FIG. 6 shows an example data structure 600 associated with a cost profile in accordance with aspects of the invention. Data structure 600 includes site 204, building 206, floor 208, system 210, LPAR 212, OS instance 214, cost ratio 404, used count 602, cost influence 604, application components 606, and cost profile 608. While data structure 600 includes fields 204-214, 402, 406-416, and 602-608, data structure 600 can include greater or fewer fields. In embodiments, fields in data structure 600 may receive information from other data structures stored by the failure analysis engine (e.g., site 204 information, cost ratio 402 information, etc., may be sent from data structure 400 (described in FIG. 4) to data structure 600).

Used count 602 is a value that indicates the number of IT infrastructure components being used in the application profile that is to be analyzed. For example, as shown in FIG. 6, there can be one site, eight systems, and 10 LPARs. Cost influence 604 is determined by using the following example equation:

(Used Count/Appliance Components)*Cost Ratio.

Accordingly, the cost influence compares an amount of a particular IT infrastructure component to the total number of appliance components and determines the cost influence on the entire application by that particular IT infrastructure component.

Application components 606 stores the amount of application components associated with a particular application. For example, as shown in FIG. 6, there can be 46 application components in an application. Cost profile 608 determines a cost profile for a particular application by using the following example equation:

Cost profile=Σ(Cost Influences)/Σ (Cost Ratios).

For example, as shown in FIG. 6, the summation of all the cost influences for each IT infrastructure component is divided by the summation of all cost ratio inputs for each IT infrastructure component and results in a value of 4.18%. Thus, for example, the cost influence for site 204 is (1/46) *75%=1.63%, and the cost influences for the other IT infrastructure components are calculated in a similar manner. Accordingly, the cost profile for the example shown in FIG. 6 is (1.63%+0.43%+0.22%+1.22%+0.87%+0.5%)/(75%+20%+10%+7%+4%+1%)=4.18%.

Protection Profile

FIG. 7 shows an example data structure 700 associated with determining a protection profile in accordance with aspects of the invention. Data structure 700 includes site 204, building 206, floor 208, system 210, LPAR 212, OS instance 214, max 702, max value 704, used count 706, used count value 708, min 710, min value 712, application components 714, and results 716. While data structure 700 shows fields 204-214 and 702-716, data structure 700 can include greater or fewer fields and/or different types of fields.

Max 702 provides the maximum protection (e.g., resiliency) for the application architecture. For example, if each application component is located at 46 different sites, then Max value 704 will be 100% since the application is diversified in 46 different locations. Used count 706 includes a value that shows how many sites, buildings, floors, systems, LPARs, and OS instances have actually been used for this application. For example, used count 706 shows 10 LPARs which will provide a protection of 21.7% (the product of 10 and 2.17) in used count value 708.

Min 710 provides for the minimum protection for the application architecture. For example, if all 46 application components are running on the same OS instance in the same LPAR in the same system located on the same floor at the same building at a single site, then Min value 712 will have a value of 2.17% protection.

Application components 714 can indicate the number of application components being used within the application architecture. In embodiments, the number of application components can be provided by a user of the failure analysis engine or can be provided by the failure analysis engine itself based on previous analysis and historical information about a particular type of application and its implementation requirements.

Results 716 can include the protection profile value and values associated with determining the protection profile value. In embodiments, the protection profile value can be determined by the following example equation:

Protection Profile Value=(Average (Used Count)−Average (Min Value))/(Average (Max Value)−Average (Min Value)).

As shown in the example formula, average values of the used count, the minimum value, and the maximum value across the different IT infrastructure components are taken and then used to determine the protection profile value. Thus, for the example shown in FIG. 7, the protection profile is (24.28%−2.17%)/(100%−2.17%)=22.59%. The protection profile value can be changed by changing one or more values for each IT infrastructure component described in data structure 700.

Failure Profile

FIGS. 8-10 show different example data structures used to determine a failure profile for particular application architectures. In embodiments, the example data structures described in FIGS. 8-10 can also use information provided in data structures described in FIGS. 4-7. In embodiments, the failure profile can use one or more analysis methods to determine failure characteristics of the application architecture. In embodiments, one or more iterations are performed over all possible failure scenarios to compute different impacts to the application. In embodiments, an iteration analyzes one or more components. As such, a weighted average is determined over the total number of iterations and, furthermore, a likelihood of failure (e.g., the chance of failure) is also factored into the determination of the failure profile. For example, a particular iteration may result in an impact of 25% reduction in application functionality and the chance of this impact occurring is 10%. Thus, that particular iteration has a failure profile of 2.5%. Furthermore, for example, another iteration may result in an impact of 40% reduction in appliance functionality and the chance of this impact occurring is 5%. Thus, this other iteration may have a failure profile of 2%.

Accordingly, taking the average of 2.5% and 2% over the average of the 10% and 5% chances of occurring provides a 30% failure profile that can be used to assess how well or how poorly the application architecture performs in comparison to potential changes that can be made to the same application or another application that shares one or more characteristics with the application being analyzed. Thus, the goal of the failure profile determination is to develop goals in designing an application architecture that has a particular number of redundant application components that will allow for the application to have a minimum level of throughput in the event of an IT infrastructure outage.

Another goal is to create an application architecture that also minimizes costs. For example, even though creating 10 redundant/clustered application components for a single functional component would result in a lower chance of failure, the costs would be higher. As a result, the failure profile assists in determining different results that provide different levels of failure along with different costs associated with the application architecture, i.e., determining a balancing act between costs and functionality to provide the optimal configuration. Accordingly, the failure analysis engine uses the data structures in FIGS. 8-10 (and also FIGS. 4-7) to determine a failure profile.

FIG. 8 shows an example data structure 800 associated with determining a failure impact on an application using method 1 in accordance with aspects of the invention. Data structure 800 includes feed servers 502, web load balancer servers 504, proxy servers 506, application load balance servers 508, web servers 510, application servers 512, database servers 514, and MQ servers 516. While data structure 800 shows fields 502-516, data structure 800 can include greater or fewer fields and/or different types of fields.

As shown in FIG. 8, the failure analysis is identified as method 1. In embodiments, method 1 can analyze a vertical application layer with the impact percentage being a portion of the overall function/throughput of all application components in that particular vertical layer. Thus, method 1 is based on how the amount of throughput that passes through each layer (e.g. a proxy servers layer) affects the throughput of the next layer (e.g., a DB servers layer), with the final amount of throughput that has passed through all the layers indicating the impact.

As shown in FIG. 8, each field within each application component has a percentage of impact to an application layer associated with a failure of an application component. For example, a particular proxy server may have a failure impact of 33.3% to the layer or the application. That particular proxy server may also have an identifier, such as ABC302.150.8UI56. In embodiments, the identifiers can be stored in data structure 800 or can be linked to another data structure that stores identifiers for each type of application component. For example, data structure 800 can be linked to data structure 500, described in FIG. 5, which stores different identifiers for different IT infrastructure components. The identifiers also determine the relationship between different application components stored/located within different IT infrastructure components. For example, an identifier for a particular application server 512 may indicate that the particular application server 512 is located in the same building as a database server 514. Additionally, or alternatively, an identifier for a particular feed server 502 may indicate that the identifier is stored within the same system as a particular proxy server 506.

By way of example, FIG. 8 describes in feed servers 502, a single server that has a 5% impact. If, for example, that feed server fails, 95% of the application transaction volume will flow to the next layer to the right (web load balancer servers 504) because only 5% of transactions are sent to that particular feed server. By way of another example, FIG. 8 describes in web load balancer servers 504, a layer that has two servers that each carry a 50% impact. Thus, if one web load balancer server fails, then only 50% of the transactional throughput volume that was received by the web load balancer layer will be sent to the next layer (application load balance servers 506). As such, each layer has an application layer impact given by a particular percentage. Thus, if no failures occur at any layer, then 100% of the transactional throughput volume will be sent through each layer which indicates that the application is performing at 100%. To further define the impact, the following example formula, as an example of method 1, can be used:

Throughput=(Previous Layer Throughput %−(Previous Layer Throughput*Current level Fail %).

For example, in proxy servers 506, it may be assumed that no components failed in feed servers 502 and web load balancer servers 504. This results in a previous layer throughput % of 100%. On the other hand, a failure of one component in proxy servers 506 results in a current level failure % of 33.33%. Thus, the throughput will be (1−(1*0.333))=66.66%. If no other failures occur in the layers to the right of proxy servers 506, as shown in FIG. 8, then the overall impact is 33.33% since 66.66% of the transactional value passed through the entire application architecture.

In further embodiments, the failure analysis engine can also perform an analysis of the impact if more than one component fails. For example, based on the previous example, the throughput of proxy servers 506 is 66.66%. However, instead of no other failures, a component in database servers 514 fails and has a 12.5% current level failure percentage. In this example, the throughput at database servers 514 will be (0.66−(0.66*0.125)=57.75%. As such, no other failures will mean that 57.75% of the transactional volume will have passed through the application architecture and that the overall impact is 42.25% (1-0.5775). Different application architecture can result in different impacts. For example, if the database server was operating on a different LPAR than the proxy server, then there would only be a 33.33% impact by operating components on a different IT infrastructure component.

FIG. 9 shows an example data structure 900 associated with determining a failure impact on an application using method 2 in accordance with aspects of the invention. In embodiments, method 2 is based on how each component's impact contributes a percentage to an application's success or failure. Data structure 900 includes feed servers 502, web load balancer servers 504, proxy servers 506, application load balance servers 508, web servers 510, application servers 512, database servers 514, and MQ servers 516. While data structure 900 shows fields 502-516, data structure 900 can include greater or fewer fields and/or different types of fields.

As shown in FIG. 9, each component within a particular layer is assigned a percentage of impact to the overall application if the corresponding application component fails. In embodiments, each application component can have an identifier that specifies an OS instance running on IT infrastructure. The identifiers may be stored in data structure 900 or can be linked to another data structure. For example, data structure 900 can be linked to data structure 500, described in FIG. 5, which stores different identifiers for different IT infrastructure components. Further, since method 2 is being used, each application component in the table is independent of other application components and provides a percentage of the overall application's function.

As shown in FIG. 9, the percentages of impact add up to less than or equal to 100%. If they add up to less than 100%, then some percentage of the overall application continues to operate if every one of these application components fails. Further, as shown in FIG. 9, for example purposes, only two categories (application servers 512 and database servers 514) have impact values shown. As such, for method 2, the failure analysis engine takes the summation of all impacts from those components that fail. For example, if two database servers fail and each database server has a 5.0% impact, then method 2 determines that the overall impact would be 5.0%+5.0%=10%. Thus, method 2 is a methodology that is based on how each component contributes a percentage to an application's overall success or failure while method 1 is based on how the amount of throughput that passes through each layer affects the throughput of the next layer with the final amount of throughput indicating the impact.

While the failure analysis engine used method 1 in FIG. 8 and method 2 in FIG. 9, the failure analysis engine can use a combination of application components which can use both method 1 and method 2. In embodiments, an analysis using both method 1 and method 2 can be performed by using the following example formula:

Impact=1−(Method 1 Throughput %−
(Method 1 Throughput %*Method 2 Fail %).

By way of example, in method 1, there is a loss of 25% which results in a throughput % of 75%. Further, under method 2, 10% of the functional capability of all the application components is lost. Thus, using the above formula, (1−(0.75−(0.75*0.10)=0.325, which is the impact to the application using a combination of method 1 and method 2.

Accordingly, the failure analysis engine can determine an application impact using method 1, method 2, or a combination of method 1 and 2, for a failure of any IT infrastructure component that affects one or more application components. As such, the failure analysis engine can simulate a failure of each and every IT infrastructure component used by any of the application components. Accordingly, a simulation can be performed for each site, building, floor, system, LPAR, and OS instance associated with the application architecture.

In addition to method 1 and method 2 analyses, a likelihood of failure (also referred to as a chance of failure) is determined for each failed IT infrastructure component. For example, a system failure may have a 7% chance of failure. As such, the chance of failure is incorporated with the method 1 and/or method 2 calculations to determine an application impact analysis which is used to determine the failure profile.

FIG. 10 shows an example data structure 1000 used to determine a failure profile in accordance with aspects of the invention. FIG. 10 shows failed component 1002, application impact 1004, type 1006, chance of failure 1008, product failure 1010, chance of failure average 1012, product failure average 1014, and failure profile 1016. While data structure 1000 shows fields 1002-1016, data structure 1000 can include greater or fewer fields and/or different types of fields.

Failed component 1002 is an identifier for an IT infrastructure component for which a simulation will be initiated. In embodiments, the IT infrastructure component can be a site, building, floor, system, LPAR, OS instance, or any other type of IT infrastructure component (or also referred to as a container). Application impact 1004 can be the application impact value determined by using method 1, method 2, or a combination of methods 1 and 2 as described above.

Type 1006 is a description of what type of IT infrastructure component is being tested by the failure analysis engine. As shown in FIG. 10, the types include, but not limited to, site, building, floor, system, LPAR, and OS instance. Chance of failure 1008 is a value that indicates the chance of failure for that particular type of IT infrastructure component. In embodiments, the chance of failure value may be provided by a user of the failure analysis engine or can be determined by the failure analysis engine based on historical information stored by the failure analysis engine. Product failure 1010 can be the product of application impact 1002 and chance of failure 1004.

Chance of failure average 1012 is an average value taken of all the chance of failure values associated with the different IT infrastructure components described in FIG. 10. As shown in FIG. 10, for example, the chance of failure average 1012 value is 1.475%. Product failure average 1014 is an average value taken of all the product failure values associated with the different IT infrastructure components described in FIG. 10. As shown in FIG. 10, for example, the product failure average 1014 value is 0.975%.

Failure profile 1016 is the overall application impact of different types of failures associated with different components. In embodiments, failure profile 1016 is based on chance of failure average 1012 and product failure average 1014. As shown in FIG. 10, the average of chance of failure average 1012 is 1.475% and product failure average 1014 is 0.975%. Thus, 0.975%/1.475%=66.1% which means that organizing the application components using these particular set of IT infrastructure components, each having different failure rates, will result in a 66.1% overall application failure profile.

As such, a user of the failure analysis engine can be used to assess one application profile versus another application profile as well assessing making changes to an application profile to see if there is any improvement in the failure profile. Accordingly, the failure profile along with the cost profile and the protection profile can provide a user of the failure analysis engine with information regarding how much money should be spent on creating an application architecture.

Thus, the failure analysis engine allows for: (i) a failure analysis method based on application layers and throughput; (ii) a failure analysis method based on each application component contributing some percentage of the application's overall functionality during a failure; (iii) combining different methods, such as method 1 and method 2, to achieve a holistic view of the application; (iv) simulating every possible IT infrastructure component failing and determining how each individual failure impacts the application; (v) applying weighted averages using the expected failure rates of each IT component to produce an overall assessment of the application's resiliency; and (vi) simultaneously assessing the failure profile, the cost profile, and the protection profile for the application to determine the application architecture that provides for the optimum high availability at an optimum cost.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   computing, by at least one computing device, an actual application impact based on an "N" number of failing information technology (IT) infrastructure components within an application architecture;
   determining, by the at least one computing device, a factor in likelihood of failure of the "N" number of IT infrastructure components; and
   determining, by the at least one computing device, a failure profile for the application architecture based on the actual application impact and the factor in likelihood of failure,
   wherein the determining the failure profile includes calculating a chance of failure average for the "N" number of failing IT infrastructure components and a product failure average for the "N" number of failing IT infrastructure components, and
   wherein the "N" number of failing IT infrastructure components include application components that include feed servers, web load balanced servers, and application servers,
   wherein the computing of the actual application impact includes analyzing a vertical application layer and calculating throughput volume in the vertical application layer, and
   wherein the calculating the throughput volume in the vertical application layer comprises subtracting a product of a previous layer throughput volume and a current level fail percentage from the previous layer throughput volume.

2. The method of claim 1, wherein the computing of the actual application impact includes analyzing the "N" number of IT infrastructure components across different layers in the application architecture.

3. The method of claim 1, wherein:
   each product failure value for one or more of the "N" number of IT infrastructure components is determined by taking the product of the computed actual application impact and the chance of failure value for the one or more of the "N" number of IT infrastructure components.

4. The method of claim 1, further comprising computing a cost profile for the application architecture.

5. The method of claim 4, wherein the computing the cost profile includes determining a cost ratio and a cost influence.

6. The method of claim 1, further comprising computing a protection profile, which determines diversification of application components stored on the "N" number of IT infrastructure components.

7. The method of claim 6, wherein the computing the protection profile includes determining a minimum level of protection and a maximum level of protection.

8. The method of claim 1, wherein the "N" number of IT infrastructure components further includes a site, a building, a floor, a system, a logical partition (LPAR), and an operating system (OS) instance.

9. The method of claim 1, further comprising outputting a graphical display of a network that indicates a relationship between the "N" number of IT infrastructure components.

10. The method of claim 1, wherein the "N" number of IT infrastructure components have identifiers that are used to relate the "N" number of IT infrastructure components to one another.

11. The method of claim 1, wherein a particular IT infrastructure component has clustered nodes that handle the operation of the particular IT infrastructure component.

12. A computer program product for analyzing an application architecture, the computer program product comprising a computer readable hardware storage device having program code stored on the computer readable hardware storage device, the program code readable/executable by a computing device to:
   compute an actual application impact based on an "N" number of failing IT infrastructure components within an application architecture;
   determine a factor in likelihood of failure of the "N" number of IT infrastructure components failing; and
   determine a failure profile based on the actual application impact and the factor in likelihood of failure, wherein the failure profile includes computing an average of product failure values for the "N" number of IT infrastructure components, wherein each product failure value is determined by taking the product of the computed actual application impact and a chance of failure value for one or more of the "N" number of IT infrastructure components, and
   wherein the "N" number of failing IT infrastructure components include application components that include feed servers, web load balanced servers, and application servers,
   wherein the computing of the actual application impact includes analyzing a vertical application layer and calculating throughput volume in the vertical application layer, and
   wherein the calculating the throughput volume in the vertical application layer comprises subtracting a product of a previous layer throughput volume and a current level fail percentage from the previous layer throughput volume.

13. The computer program product of claim 12, further comprising determining a protection profile, wherein the protection profile includes determining a minimum level of protection and a maximum level of protection.

14. The computer program product of claim 13, further comprising determining a cost profile, wherein the cost profile includes determining a cost ratio and a cost influence.

15. The computer program product of claim 14, wherein the cost profile, the protection profile, and failure profile are used to identify how failing the "N" number of IT infrastructure components affect the application architecture.

16. The computer program product of claim 12, wherein the determining the failure profile includes using a combination of analyzing vertical application layers and analyzing application components.

17. A system comprising:
a CPU, a computer readable memory and a computer readable storage medium;
program instructions to determine a cost profile for an application architecture based on "N" number of IT infrastructure component information, cost ratio information, and cost influence information;
program instructions to determine a protection profile for the application architecture based on the "N" number of IT infrastructure component information and maximum protection information;
program instructions to determine an actual application impact based on the "N" number of IT infrastructure component information within the application architecture; and
program instructions to determine a failure profile for the application architecture based on the "N" number of IT infrastructure component information, application component information, the actual application impact, and chance of failure information, wherein the failure profile indicates a level of resistance of the application architecture to failure of one or more of the "N" number of IT infrastructure components;
wherein the program instructions are stored on the computer readable storage medium for execution by the CPU via the computer readable memory,
wherein the program instructions to determine the failure profile includes calculating a chance of failure average for the "N" number of IT infrastructure components and a product failure average for the "N" number of IT infrastructure components, and
wherein the "N" number of IT infrastructure components include application components that include feed servers, web load balanced servers, and application servers,
wherein the determining the actual application impact includes analyzing a vertical application layer and calculating throughput volume in the vertical application layer, and
wherein the calculating the throughput volume in the vertical application layer comprises subtracting a product of a previous layer throughput volume and a current level fail percentage from the previous layer throughput volume.

18. The method of claim 1, wherein a value of the chance of failure for each of the "N" number of failing IT infrastructure components is determined by dividing a mean time to failure (MTTF) by a summation of the mean time to failure (MTTF) and a mean time to recovery (MTTR).

* * * * *